United States Patent [19]

Beers et al.

[11] Patent Number: 4,514,529

[45] Date of Patent: Apr. 30, 1985

[54] OIL RESISTANT LOW MODULUS SILICONE SEALANT COMPOSITION

[75] Inventors: Melvin D. Beers, Hudson; James E. Thompson, Lakewood, both of Ohio

[73] Assignee: Loctite Corporation, Newington, Conn.

[21] Appl. No.: 593,866

[22] Filed: Mar. 27, 1984

[51] Int. Cl.$^3$ .................... C08G 77/26; C08K 9/04; C08K 3/26; C08L 83/08

[52] U.S. Cl. ................. 523/200; 524/731; 524/773; 524/788; 524/864

[58] Field of Search .......... 524/731, 864, 773, 788; 523/200

[56] References Cited

U.S. PATENT DOCUMENTS

| | | | |
|---|---|---|---|
| 3,184,427 | 5/1965 | Russell | 524/864 |
| 3,419,516 | 12/1968 | Tarno | 524/864 |
| 4,323,489 | 4/1982 | Beers | 524/864 |
| 4,356,116 | 10/1982 | Beers | 524/731 |
| 4,360,631 | 11/1982 | Hahn | 524/864 |
| 4,410,677 | 10/1983 | Lampe | 524/731 |
| 4,447,576 | 5/1984 | Fukayama | 524/864 |

Primary Examiner—C. Warren Ivy
Attorney, Agent, or Firm—Eugene F. Miller; Daniel J. Hudak

[57] ABSTRACT

A low modulus, one component, room temperature vulcanizable silicone elastomer which has very good oil resistance properties as well as high elongation. The silicone elastomer which has low volatility comprises a silanol terminated diorganosiloxane base polymer, a trimethylsilyl terminated diorganopolysiloxane, generally a tin catalyst, as well as a oxime crosslinking agent and specific low moisture fillers, usually calcium carbonate. The material is ideally suited as a gasket sealant as well as a formed-in-place gasket and can be utilized on internal combustion engines such as automotive engines as a sealant for an oil pan, valve cover, side seals and the like.

19 Claims, No Drawings

OIL RESISTANT LOW MODULUS SILICONE SEALANT COMPOSITION

TECHNICAL FIELD

The present invention relates to a low modulus, low odor, one component room temperature vulcanizable silicone formed-in-place gasketing sealant of a low volatility as well as being non-corrosive with regard to ferrous and aluminum substrates.

BACKGROUND ART

Heretofore, low modulus characteristics of silicone rubbers have been desirable with regard to accommodating joint movement due to vibration and thermal cycling since less stress is exerted on a sealant-metal bond interface, thus decreasing the probability of oil leaks. However, oil resistance has been traditionally improved by utilizing comparatively high crosslink densities. The result was lower elongation properties and, hence, reduced movement capabilities. Should lower modulus be achieved by incorporating fewer crosslinks into the elastomer, more rapid deterioration of the polymer backbone by nucleophilic or electrophilic agents at elevated temperatures occurred. Hence, good low modulus, high elongation elastomers having good oil resistance were generally not achieved.

U.S. Pat. No. 3,189,576 to Sweet relates to organosilicon intermediates containing silicon bonded oxime radicals.

U.S. Pat. No. 3,837,878 to Beers relates to a process for treating silica fillers by contacting the silica filler with a mixture of a hydroxyl amine, a cyclic siloxane and a silyl nitrogen compound. The end result was a filler such as silica having a large number of organosiloxy groups appended to it.

U.S. Pat. No. 4,356,116 to Beers relates to a devolatilized room temperature vulcanizable silicone rubber composition having a silanol polymer, a plasticizing fluid, containing a combination of monofunctional, difunctional and trifunctional siloxy groups, a crosslinking agent, a curing promoter and, optionally, a filler.

U.S. Pat. No. 4,395,526 to White et al relates to a stable, substantially acid free, one component curable polyalkoxy-terminated organopolysiloxane composition having a condensation catalyst, such as a tin compound. The fillers include titanium dioxide, iron oxide, fumed silica, carbon black, calcium carbonate, quartz, and the like.

However, none of these patents teach or suggest a low modulus silicone elastomer having good oil resistance and high elongation.

Formed-in-place silicone gasketing has been utilized at the OEM level in the automotive industry since 1971, Handbook of Adhesives, Second Edition, Skeist, published by Van Nostrand, Reinhold Co. (1977) Chapter 39 by Beers. The first generation sealants used the acetoxy curing systems, like those disclosed in U.S. Pat. Nos. 3,035,016 to Bruner, 3,133,891 by Ceyzeriat and 3,382,205 to Beers. The next generation involved amine curing systems like those disclosed in U.S. Pat. No. 3,032,528 to Nitzsche and octoate curing systems disclosed in U.S. Pat. No. 4,356,116 and 4,257,932 to Beers. Recently, formed-in-place silicone gasketing systems have been reported to utilize methoxysilicone vulcanization (General Motors specification 9985530).

In as much as traditionally improved oil resistance was achieved in silcone gasketing technology by operating at comparatively high crosslink densities, U.S. Pat. No. 4,257,932, the achievement of an improved oil resistance utilizing high elongation material of the present invention was unexpected and lends credence to the uniqueness of the present invention.

DISCLOSURE OF THE INVENTION

Accordingly, it is an aspect of the present invention to provide a low modulus, high elongation, oil resistant silicone rubber.

It is a further aspect of the present invention to provide a low modulus silicone rubber, as above, which comprises a devolatilized silanol terminated diorganosiloxane polymer, and a devolatilized trimethylsilyl terminated diorganopolysiloxane plasticizer.

It is a still further aspect of the present invention to provide a low modulus silicone rubber, as above, which is a low odor, one component room temperature vulcanizable formed-in-place gasketing sealant.

It is another aspect of the present invention to provide a low modulus silicone rubber, as above, which contains an oxime crosslinking agent as well as hydrophobic calcium carbonate fillers.

These and other aspects of the present invention shall become apparent from the following specification.

In general:

a low modulus, one component, room temperature, vulcanizable silicone rubber composition comprising:

from about 25 to about 90 percent by weight based upon the total weight of the composition of a devolatilized silanol/terminated diorganosiloxane base polymer having a viscosity from about 2,000 to about 250,000 centipoises at 25° C. where said organo groups can be the same or different and is selected from the group consisting of an alkyl having from 1 to 8 carbon atoms, a cycloalkyl having from 4 to 7 carbon atoms, an alkenyl having from 2 to 8 carbon atoms, an aryl or an alkyl substituted aryl having from 6 to 14 carbon atoms, or a fluoroalkyl having from 1 to 8 carbon atoms;

from about 0 to about 40 percent by weight based upon the total weight of said composition of a devolatilized diorganopolysiloxane fluid plasticizer terminated with triorgano siloxy groups, said organo groups being a monovalent hydrocarbon radical as set forth above with regard to said base polymer, said plasticizer having a viscosity from about 50 to about 100,000 centipoises at 25° C.;

from about 2 to about 15 percent by weight based upon the total weight of said composition of an oxime crosslinking agent of the formula

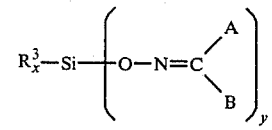

where y is 2.2 to 3, x is 0.8 to 1.0, where $R^3$ is selected from the group consisting of an alkyl having from 1 to 8 carbon atoms, an alkenyl having from 2 to 8 carbon atoms, a haloalkyl having from 1 to 8 carbon atoms, a trifluoroalkyl having from 1 to 8 carbon atoms, and a haloalkenyl having from 2 to 8 carbon atoms, where A and B can be the same or different and wherein A and B are selected from the group consisting of an alkyl having from 1 to 8 carbon atoms, a haloalkyl having from 1 to 8 carbon atoms, a cycloalkyl having from 4 to 7 carbon atoms and an alkenyl having from 2 to 8 carbon atoms, and a hydrogen or cycloalkenyl having from 4 to 7 carbon atoms;

from about 0.1 to about 0.5 percent by weight based upon the total weight of said composition of an organo tin catalyst and;

from about 5 to about 60 percent by weight based upon the total weight of said composition of a hydrophobic calcium carbonate filler.

BEST MODE FOR CARRYING OUT THE INVENTION

The basic ingredient of the low modulus, high elongation, good oil resistance, room temperature vulcanizable (RTV) silicone composition of the present invention is a devolatilized silanol terminated diorganosiloxane polymer. This linear polymer can be devolatilized in any manner such as set forth in U.S. Pat. No. 4,356,116 and generally has a viscosity of from about 2,000 to about 250,000 centipoise and preferably from about 10,000 to about 120,000 centipoise. The polymer has the formula

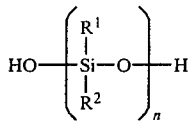

where n is from about 300 to about 1,000, where $R^1$ and $R^2$ can be the same or different, where $R^1$ and $R^2$ is an alkyl group having from 1 to 8 carbon atoms with methyl being preferred, a cycloalkyl group having from 4 to 7 carbon atoms such as cyclohexyl, an alkenyl group having from 2 to 8 carbon atoms such as allyl with vinyl being preferred, an aryl or an alkyl substituted aryl group having from 6 to 14 carbon atoms such as phenyl, methylphenyl, or a fluoroalkyl group having from 1 to 8 carbon atoms with 3,3,3-trifluoropropyl being preferred. The amount of the linear polymer generally ranges from about 25 to about 90 percent by weight and preferably from 30 to about 60 percent by weight based upon the total weight of the low modulus RTV silicone composition. Such polymers are commercially available and are manufactured by Mobay, Union Carbide and Wacker Chemie.

The plasticizer utilized along with the linear base polymer is a devolatilized triorganosiloxy terminated diorganopolysiloxane fluid existing in an amount of from 0 or 1 to about 40 percent by weight and desirably from 5 to about 25 percent by weight based upon the total siloxane composition. The plasticizer lowers the durometer and modulus of the cured rubber and, lowers the viscosity of the overall system or composition. However, the viscosity should not be too low in as much as it will tend to bleed out of the composition. Accordingly, the viscosity generally ranges from about 50 to about 100,000 centipoise and preferably from about 500 to about 10,000 centipoise.

The plasticizer is a diorganopolysiloxane polymer terminated with monofunctional, triorgano siloxy end groups. The organo compounds within the repeating units are the same as $R^1$ and $R^2$ set forth herein above. However, it may contain trace quantities of trifunctional monoorganosiloxy units originating from impurities in the starting materials. The siloxy units contain an alkyl group having from 1 to 8 carbon atoms with methyl being preferred. The number of repeating units in the plasticizer is generally from about 20 to about 900. As with the linear base polymer, the plasticizer is devolatilized in accordance with any conventional manner or process, well known to the art. A specific example of devolatilization is set forth in U.S. Pat. No. 4,356,116 which is hereby fully incorporated by reference.

In order to reinforce the polymer network as well as to impart non-sag to the system, a thixotropic agent is added to the overall composition. This agent which also adds physical strength to the system desirably is a treated or an untreated silica filler with a treated fumed silica filler being preferred. Treated silica fillers generally have lower moisture content, and result in better low modulus properties. The amount of silica filler generally ranges from about 1 to about 20 percent by weight and from about 3 to about 8 percent by weight being preferred. Treated or untreated silica fillers are well known to the art and generally any such conventional filler can be utilized. Examples of specific silica fillers are set forth in U.S. Pat. No. 3,837,878 which is hereby fully incorporated by reference. Additionally, treated silica as set forth in Lucas U.S. Pat. No. 2,938,009, Lichtenwalner U.S. Pat. No. 3,004,859, and Smith U.S. Pat. No. 3,635,743, all hereby fully incorporated by reference, can be utilized. Typically, the silica filler has a very high surface area such as about 200 $M^2$/gram.

Optionally, from about 0.1 to about 5 percent by weight and preferably from about 0.2 to about 3 percent by weight based upon the total weight of the overall system or composition of a thermal aging additive can be utilized. This optional component functions to reduce oxidation and thermal rearrangement of polymers at elevated temperatures. These antioxidants may include materials like cerium neodecanoate, rare earth octoates and iron octoate! Representative samples also usually include pigments such as carbon black, iron oxide powder, titanium dioxide, aluminum powder, and the like. Naturally, any desired color can be utilized.

In association with the oxime crosslinking or curing agent of the present invention is utilized an organo tin salt catalyst. The amount of said catalyst generally is from about 0.01 to about 0.5 percent by weight and preferably from about 0.02 to about 0.2 percent by weight based upon the total weight of the said composition of the present invention. The tin catalyst is generally an organotin compound well known to the art and as set forth in U.S. Pat. Nos. 4,356,116, and 4,395,526, hereby fully incorporated by reference. Examples of specific tin compounds include dibutyltindilaurate, dibutyltindiacetate, tin octoate, dimethyl tin dibutyrate, triethyl tin tartrate, tin oleate, dibutyl tin oxide, and dimethyltinbis neodecanoate, etc.

An important aspect of the present invention is the use of specific oxime curing or crosslinking agents. It has been found that such agents readily accommodate the formulation of general low modulus properties and allow the overall system or composition to have high elongation as well as very good oil resistant properties. Low modulus characteristics are desirable in various applications of the present composition as in gasketing applications since they allow for maximum joint movement without exposing the substrate-sealant interface to high stresses which can lead to adhesive failure of the interface, thus resulting in oil leak paths. The low modulus behavior of the material set forth herein insures a good oil seal. The type of oxime curing agent is set forth by the formula

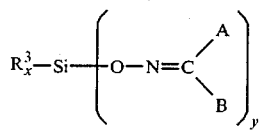

where y is 2.2 to 3, preferably 3, x is 0.8 to 1, preferably 1, and wherein $R^3$ is an alkyl having from 1 to 8 carbon atoms with methyl being preferred, an alkenyl having from 2 to 8 carbon atoms with vinyl being preferred, a haloalkyl having from 1 to 8 carbon atoms, a trifluoroalkyl having from 1 to 8 carbon atoms, or a haloalkenyl having from 2 to 8 carbon atoms. A or B can be the same or different except where one is hydrogen then the other must be a hydrocarbon group. A or B can be a hydrogen, or alkyl having from 1 to 8 carbon atoms, an haloalkyl having from 1 to 8 carbon atoms, a cycloalkyl having from 4 to 7 carbon atoms, an alkenyl having from 2 to 8 carbon atoms, or a cycloalkenyl having from 4 to 7 carbon atoms. A is preferably methyl with B preferably being ethyl. The amount of the oxime curing agent ranges from about 2 to about 15 percent by weight with from about 4 to about 8 percent by weight being preferred based upon the total weight of the composition. Preparation of the curing agents of the present invention is generally well known to the art as set forth in U.S. Pat. No. 3,189,576, which is hereby fully incorporated by reference as to the types of such curing agents. In order to insure that gellation or viscosity increases do not occur, an excess of oxime crosslinking agents to the silanol in the base polymer is utilized as an equivalent ratio of from about 1.2 to about 4.0 with from about 1.5 to about 2.5 being preferred.

Another important aspect of the present invention is the use of a hydrophobic calcium carbonate filler which imparts a desirable oil stabilizing effect as well as a low degree of reinforcement to the polymer to allow for the incorporation of low modulus properties. The amount of hydrophobic filler generally ranges from about 5 to about 60 percent by weight with from about 15 to about 45 percent by weight based upon a total composition weight being preferred. It is important to the present invention that the water level of the hydrophobic filler be very low. Accordingly, if small amounts of filler are utilized, that is 15 percent by weight or less, the water level can range up to 0.4 percent by weight based upon the total weight of hydrophobic filler. Generally, the water content is 0.2 percent by weight or less with from about 0.1 percent by weight or less being preferred.

According to test data, it appears that an important criteria of a suitable hydrophobic filler is that it be a treated ground or precipitated calcium carbonate. Accordingly, specific examples of suitable fillers include stearic acid treated ground calcium carbonate, stearic acid treated precipitated calcium carbonate, and calcium carbonate having the above noted low moisture contents. The general particle size is from about 0.03 to about 50 microns with about 0.05 to 20 microns being the desirable range. Generally, talc, silica and clay type materials are not suitable due to the high moisture content and lack of stabilization properties.

In addition to the above set forth components, various other conventional compounds such as antioxidants, such as cerium neodecanoate, rare earth octoate and iron octoate, can be utilized in the composition of the present invention in conventional amounts such as about 0.1 to about 0.3 percent without detracting from the concepts of the principal invention.

Ihe above described components result in a low modulus, low odor, one-component RTV silicone formed-in-place material which is noncorrosive with regard to iron, steel and aluminum substrates. In addition, the disclosed material of the present invention has a low modulus, high elongation and very good oil resistant properties. Moreover, the composition readily meets low silicone volatility requirements such as General Motors specification 9985443. In general, compositions of the general invention have a modulus value at 50 percent of 75 psi or less with 50 psi or less being preferred. The tensile strength at 75 percent modulus is 90 psi or less with 70 psi or less being preferred. At 100 percent modulus the value is usually 110 psi or less with 90 psi or less being preferred. With regard to the oil resistance, the precentage decrease in tensile strength after two weeks at 300° F. in 5W30 engine fill oil is generally 40 percent or less with 30 percent or less being preferred.

The compositions of the present invention are ideally suited as in-place gasketing sealants in that they have good thermal resistance at high temperatures for example about 300° F. to 500° F. and yet still maintain good flexability at low temperatures for example to about −80° F. The particular area of usage is in various internal combustion engines and for various gaskets thereof such as oil pan, valve cover, engine side seal, water seal, intake seal, and the like.

The compositions are generally prepared by charging the various ingredients into a mixer under dry conditions as through the use of dry nitrogen to prevent hydrolysis of the oxime crosslinking compound. Generally, the polymer is added first with the plasticizer. The oxime crosslinker compound is then added followed by the fumed silica, as well as any thermal stabilizing agent. The particular hydrophobic calcium carbonate filler is then added. The tin catalyst is added last in order to minimize any hydrolysis of the crosslinking agent during momentary exposure to atmospheric moisture. The composition is then generally mixed under high speed or agitation as well as under a vacuum for several minutes or even hours to remove the entrapped nitrogen bubbles. The resulting paste formed can be placed or extruded into a desirable container and the like.

The invention will be better understood by reference to the following examples:

EXAMPLE 1

| | Weight % |
|---|---|
| 1. 75,000 cps viscosity silanol terminated polydimethylsiloxane | 40.27 |
| 2. 1000 cps trimethylsilyl terminated polydimethylsiloxane | 15.55 |
| 3. Stearic acid treated calcium carbonate | 34.23 |
| 4. Polydimethylsiloxane treated fumed silica having a surface area of approximately 200 m²/gram | 3.63 |
| 5. Iron oxide | 1.41 |
| 6. Methyltris-methylethylketoximosilane | 4.83 |
| 7. Dimethyltinbisneodecanoate | 0.08 |

This composition was prepared by charging the ingredients into the mixing can of a vertical laboratory changecan mixer which had been flushed with dry nitrogen to prevent the hydrolysis of the oxime crosslinker. They were subsequently added as follows: (1), (2), (6), (5), (3), (4) and (7). Then mixed at high speed under vacuum for approximately two hours and afterwards the resulting paste was transferred to a pressure Semco mixer. It was then extruded from the pressure Semco into six ounce polyethylene cartridges. ASTM sheets of the product were prepared and allowed to cure on exposure to atmospheric moisture for seven days and then tested in the manner described above.

In another experiment 0.5 weight percent of an adhesion promoter was added to the composition of Example 1.

The resultant one component RTV sealant was used to prepare peel adhesion specimens. After two weeks cure it yielded excellent adhesion properties on an aluminum substrate as indicated by the resulting cohesive failure of the specimens when they were pulled on an Instron tester.

A basic screening formulation containing comparatively high viscosity (75,000 cps) silanol terminated polymer was utilized in evaluating the performance characteristics of the various fillers. The high viscosity polymer was chosen because its elevated molecular weight imparts characteristically greater elongation properties and hence contributes to the low modulus behavior of the resulting sealant products. The composition of the test formulation was as follows:

| High Viscosity Polymer | Weight % |
| --- | --- |
| 6. Dimethyltinbis-neodecanoate | 0.09 |
| 7. Test filler | 25.20 |

The above compositions were prepared by charging the ingredients into a vertical laboratory change can mixer under dry nitrogen to prevent the hydrolysis of the oxime crosslinker. They were subsequently added in the following order: (1), (2), (5), (3), (4), (7) and (6). The composition was mixed at high agitator speed under dry nitrogen for one hour after the test filler (7) was added. The dimethyltin bis-neodecanoate was then added and mixed under vacuum for twenty minutes to remove the entrapped nitrogen. The following commercial grades of filler were examined: OMYA F-T (stearic acid treated calcium carbonate), Albacar 5970 (precipitated calcium carbonate), Imsil 54 (ground quartz), White #1 (ground calcium carbonate), Emtal 42 (a talc), Armco 70 (ground calcium carbonate) and Huber 90A (a clay). Both White #1 calcium carbonate and Huber 90A clay caused the RTV silicone to cure in the container due to high moisture contents. Both the Imsil 54 ground quartz and Emtal 42 talc yielding higher modulus properties than desired for the higher molecular weight 75,000 cps polymer and also lacked the oil stabilization effects imparted by their calcium carbonate counterparts. Both the initial room temperature physical properties and oil immersion characteristics are shown on Table I.

TABLE I

| FILLER TYPE | OMYA FT (STEARIC ACID TREATED CALCIUM CARBONATE) | ALBACAR 5970 PRECIPITATED CALCIUM CARBONATE | WHITE #1 GROUND CALCIUM CARBONATE | ARMCO 70 CALCIUM CARBONATE | IMSIL 54 GROUND QUARTZ SILICA | EMTAL 42 TALC | HUBER 90 CLAY |
| --- | --- | --- | --- | --- | --- | --- | --- |
| THE EFFECT OF FILLER TYPES ON THE MODULUS AND OIL RESISTANCE PROPERTIES ROOM TEMPERATURE PROPERTIES (SEVEN DAYS 25° C. AND 50% RELATIVE HUMIDITY) | | | | | | | |
| SHORE A, HARDNESS | 25 | 34 | CURED IN TUBE | 30 | 31 | 34 | CURED IN TUBE |
| TENSILE, PSI | 192 | 272 | | 167 | 244 | 206 | |
| @ 50% MODULUS | 40 | 49 | | 44 | 66 | 73 | |
| @ 75% MODULUS | 51 | 65 | | 61 | 83 | 97 | |
| @ 100% MODULUS | 61 | 83 | | 72 | 103 | 119 | |
| ELONGATION, % | 460 | 480 | | 380 | 260 | 280 | |
| TWO WEEKS @ 300° F. IN 5W-30 FACTORY FILL ENGINE OIL (CITGO) | | | | | | | |
| SHORE A, HARDNESS | 20 | 25 | — | 20 | 23 | 22 | CURED IN TUBE |
| TENSILE, PSI | 145 | 229 | — | 121 | 113 | 119 | |
| % DECREASE | −25 | −16 | — | −28 | −54 | −43 | |
| ELONGATION, % | 410 | 470 | — | 380 | 330 | 430 | |

EXAMPLE 2

| High Viscosity Polymer | Weight % |
| --- | --- |
| 1. Devolatilized silanol terminated dimethylpolysiloxane having a viscosity of 75,000 cps. | 45.81 |
| 2. A devolatilized trimethylsilyl terminated dimethylpolysiloxane plasticizer fluid having a viscosity of 1,000 cps | 17.68 |
| 3. A trimethylsiloxy treated fumed silica (Wacker HDK H-20) | 4.12 |
| 4. Iron oxide powder | 1.60 |
| 5. Methyltri(methylethylketoximo)silane | 5.50 |

Examination of the data in Table I shows the advantages of utilizing certain types of calcium carbonates. Note that the percentage loss of tensile strength after oil immersion is approximately one-half that of compositions containing the other filler types. Weight loss studies revealed that the filler must usually contain less than 0.2 weight percent moisture to yield a stable composition. The White #1 calcium carbonate cured in the tube because it had a moisture content of approximately 0.5 percent, whereas the clay had a moisture content of approximately 0.7 percent.

To further illustrate the influence of filler type and moisture level on the behavior of the final formed-in-place gasketing product, the following example is given. The filler utilized was a fine grade of stearic acid treated calcium carbonate known as(Ultra-Pflex and having an average particle size of 0.07 microns. The moisture content of the filler was approximately 0.4 Wt. percent. The water was apparently occluded in the filler structure since it took several days for the sealant to vulcanize within the moisture-proof tube. However, excellent low modulus properties were achieved with the comparatively low molecular weight 11,000 cps, silanol terminated dimethylpolysiloxane polymer.

EXAMPLE 3

| Low Modulus<br>FIPG Silicone<br>(Low Viscosity Version) | |
|---|---|
| | Weight % |
| I. Composition: | |
| 1. Devolatilized silanol terminated dimethylpolysiloxane having a viscosity of 11,000 cps. | 44.19 |
| 2. A devolatilized trimethylsilyl terminated dimethylpolysiloxane plasticizer fluid having a viscosity of 1,000 cps. | 17.06 |
| 3. A trimethylsiloxy treated fumed silica (Wacker HDK H-20) | 3.98 |
| 4. Ultra-Pflex filler (0.07 micron size stearic acid treated calcium carbonate) | 28.72 |
| 5. Methyltri-(methylethylketoximo) silane | 5.30 |
| 6. Adhesion promoter | 0.22 |
| 7. Fungicide | 0.44 |
| 8. Dimethyltinbis-neodecanoate | 0.09 |
| | 100.00 |
| II. Performance Properties | |
| Cure time: | Seven days at 50% relative Humidity and 25° C. |
| Shore A, hardness | 30 |
| Tensile, psi | 274 |
| @ 50% modulus | 42 |
| @ 75% modulus | 53 |
| @ 100% modulus | 66 |
| Elongation, % | 530 |

One final example of the benefits to be derived from this technology is shown below. The composition has been designed to be of a medium modulus formed-in-place gasketing product. It aptly shows the superior oil resistance imparted by the technology described in this disclosure. Note the low thirteen percent loss in tensile strength in comparison with the forty to fifty percentage decrease normally observed in other systems (see examples shown earlier).

| Medium Modulus<br>Formulation | |
|---|---|
| | Weight % |
| I. Composition: | |
| 1. Devolatilized silanol terminated dimethylpolysiloxane having a viscosity of 15,000 cps | 39.79 |
| 2. A devolatilized, trimethylsilyl terminated dimethylpolysiloxane plasticizer fluid having a viscosity of 1,000 cps | 15.36 |
| 3. A trimethylsiloxy treated fumed silica (Wacker HDK H-20) | 5.17 |
| 4. Stearic acid treated calcium carbonate (OMYA F-T) | 33.82 |
| 5. Carbon black pigment | 1.00 |
| 6. Vinyl tri-(methylethylketoximo)silane | 4.78 |
| 7. Dimethyltinbis-neodecanoate | 0.08 |
| | 100.00 |
| II. Performance Properties: | |
| a. Initial | |
| Shore A, hardness | 40 |
| Tensile, psi | 218 |
| 50% modulus | 71 |
| 75% modulus | 88 |
| 100% modulus | 100 |
| Elongation, % | 310 |
| b. Properties after immersion for 14 days @ 150° C. (300° F.) in 5 W 30 factory fill engine oil. | |
| Shore A, hardness | 22 |
| Tensile, psi | 190 |
| % Decrease | −13 |
| Elongation, % | 340 |

A summary of the physical characteristics of the calcium carbonates utilized is given in the table shown below:

| PHYSICAL CHARACTERISTICS OF CALCIUM CARBONATES | | | | | |
|---|---|---|---|---|---|
| | OMYA[1] F-T | Ultra[2] Pflex | Albacar[3] 5970 | White #1 Calcium Carbonate | Armco 70[5] |
| Surface Treatment | Stearic Acid | Stearic Acid | None | None | None |
| Average Particle Size, microns | 2.0 | 0.07 | 2.0 | 14 | 7.0 |
| Moisture content, Weight % | 0.2 | 0.4 | 0.2 | 0.5 | 0.2 |
| Oil Absorption grams/ 100 grams | 14 | 35 | 38 | — | — |
| Specific Gravity | 2.71 | 2.65 | 2.71 | 2.71 | 2.71 |
| Type | Ground | Precipitated | Precipitated | Ground | Ground |

Sources:
[1] OMYA F-T - OMYA, Inc. 61 Main Street, Proctor, Vt. 05765
[2] Ultra-Pflex - Pfizer Minerals, Pigments, and Metals Divn. 235 East 42nd Street, New York, New York 10017
[3] Albacar 5970 - Pfizer Minerals, Pigments, and Metals Divn. 235 East 42nd Street, New York, New York 10017
[4] White #1 Calcium Carbonate - Thompson, Weinman and Co. P.O. Box 130, Carterville, GA 30120
[5] Armco Carbonate Products, P.O. Box 911, Dept. LCF-282, Piqua, Ohio 45356

From examining the above examples, it should be apparent that good physical properties such as low modulus values, and high elongation characteristics along with very good oil immersion properties were obtained. Thus, it should be apparent from the present invention that, although low modulus and high elongation values are obtained, the compositions of the present invention have very good oil resistance properties.

While in accordance with the patent statutes the best mode and preferred embodiment have been described in detail, the scope of the invention is not to be limited thereto, but rather limited by the scope of the attached claims:

What is claimed is:

1. A low modulus, one component, room temperature, vulcanizable silicone rubber composition consisting essentially of:

from about 25 to about 90 percent by weight based upon the total weight of the composition of a devolatilized silanol/terminated diorganosiloxane base polymer having a viscosity from about 2,000 to about 250,000 centipoises at 25° C. where said organo groups can be the same or different and are selected from the groups consisting of alkyl having from 1 to 8 carbon atoms, a cycloalkyl having from 4 to 7 carbon atoms, an alkenyl having from 2 to 8 carbon atoms, an aryl or an alkyl substituted aryl having from 6 to 14 carbon atoms, or a fluoroalkyl having from 1 to 8 carbon atoms;

from about 0 to about 40 percent by weight based upon the total weight of said composition of a plasticizer comprising a devolatilized diorganopolysiloxane fluid plasticizer terminated with triorganosiloxy groups, said organo groups being a monovalent hydrocarbon radical as set forth above with regard to said base polymer, said plasticizer having a viscosity from about 50 to about 100,00 centipoises at 25° C.;

from about 2 to about 15 percent by weight based upon the total weight of said composition of an oxime crosslinking agent of the formula

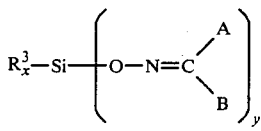

where y is 2.2 to 3, x is 0.8 to 1.0, where $R^3$ is selected from the group consisting of an alkyl having from 1 to 8 carbon atoms, an alkenyl having from 2 to 8 carbon atoms, a haloalkyl having from 1 to 8 carbon atoms, and a haloalkenyl having from 2 to 8 carbon atoms, where A and B can be the same or different and wherein A and B are selected from the group consisting of a hydrogen, an alkyl having from 1 to 8 carbon atoms, a haloalkyl having from 1 to 8 carbon atoms, a cycloalkyl having from 4 to 7 carbon atoms, an alkenyl having from 2 to 8 carbon atoms, and a cycloalkenyl having from 4 to 7 carbon atoms;

from about 0.01 to about 0.5 percent by weight based upon the total weight of said composition of an organo tin catalyst and;

from about 5 to 60 percent by weight based upon the total weight of said composition of a hydrophobic calcium carbonate filler having 0.4 percent or less water content therein when the amount of said filler is 15 percent or less, or 0.2 percent or less water content when the amount of said filler ranges from about 15 to about 60 percent by weight.

2. A silicone rubber according to claim 1, wherein said hydrophobic filler is selected from the group consisting of treated ground calcium carbonate.

3. A silicone rubber according to claim 2, including from about 1 to about 20 percent by weight based upon the total weight of said composition of a fumed silica.

4. A silicone rubber composition according to Claim 3, wherein the 100 percent modulus of said composition is 110 psi or less.

5. A silicone rubber composition according to claim 4, wherein the percentage decrease in tensile strength after two weeks at 300° F. in 5W-30 engine fill oil is 40 percent or less.

6. A silicone rubber composition according to claim 5, wherein said fumed silica is a treated fumed silica, and wherein said repeating organo groups of said base polymer and said plasticizer polymer is methyl or vinyl.

7. A silicone rubber composition according to claim 6, wherein $R^3$ of said oxime crosslinking agent is said alkyl or said alkenyl, wherein y of said oxime formulation is 3, and wherein A is methyl and B is ethyl.

8. A silicone rubber composition according to claim 7, wherein the equivalent ratio of said oxime crosslinking agent to said silanol end groups of said polymer is from about 1.2 to about 4.0.

9. A silicone rubber composition according to claim 8, wherein the viscosity of said polymer ranges from about 10,000 to about 120,000 centipoises, wherein the amount of said polymer ranges from about 30 percent to about 60 percent, and wherein the said viscosity of said plasticizer is from about 500 to about 10,000 centipoises and wherein the amount of said plasticizer ranges from about 5 percent to about 25 percent by weight.

10. A silicone rubber composition according to claim 9, wherein the amount of said oxime curing agent ranges from about 4 percent to about 8 percent by weight.

11. A silicone rubber composition according to claim 10, wherein the amount of said fumed silica ranges from about 3 percent to about 8 percent by weight.

12. A silicone rubber composition according to claim 11, wherein the amount of said hydrophobic filler ranges from 15 to about 45 percent and the moisture content thereof is 0.1 percent by weight or less.

13. A silicone rubber composition according to claim 12, wherein $R^3$ of said oxime curing agent is selected from the group consisting of methyl, and vinyl.

14. A silicone rubber composition according to claim 1 including from 0.1 to about 5 percent by weight of a thermal aging additive.

15. A silicone rubber composition according to claim 5 including from about 0.1 to about 5 percent by weight of a thermal aging additive.

16. A silicone rubber composition according to claim 11 including from about 0.5 to about 3 percent by weight of a iron oxide as a thermal aging additive.

17. A silicone rubber composition according to claim 1, wherein said 100 percent modulus is 90 psi or less and wherein said percentage decrease in tensile strength after two weeks at 300° F. in 5W-30 engine fill oil is 30 percent or less.

18. A silicone rubber composition according to claim 6, wherein said 100 percent modulus is 90 psi or less and wherein said percentage decrease in tensile strength after two weeks at 300° F. in 5W-30 engine fill oil is 30 percent or less.

19. A silicone rubber composition according to claim 12, wherein said 100 percent modulus is 90 psi or less and wherein said percentage decrease in tensile strength after two weeks at 300° F. in 5W-30 engine fill oil is 30 percent or less.

* * * * *